(No Model.)
R. R. NOYES.
HARNESS AND NECK YOKE FOR DOUBLE TEAMS.
No. 310,305. Patented Jan. 6, 1885.
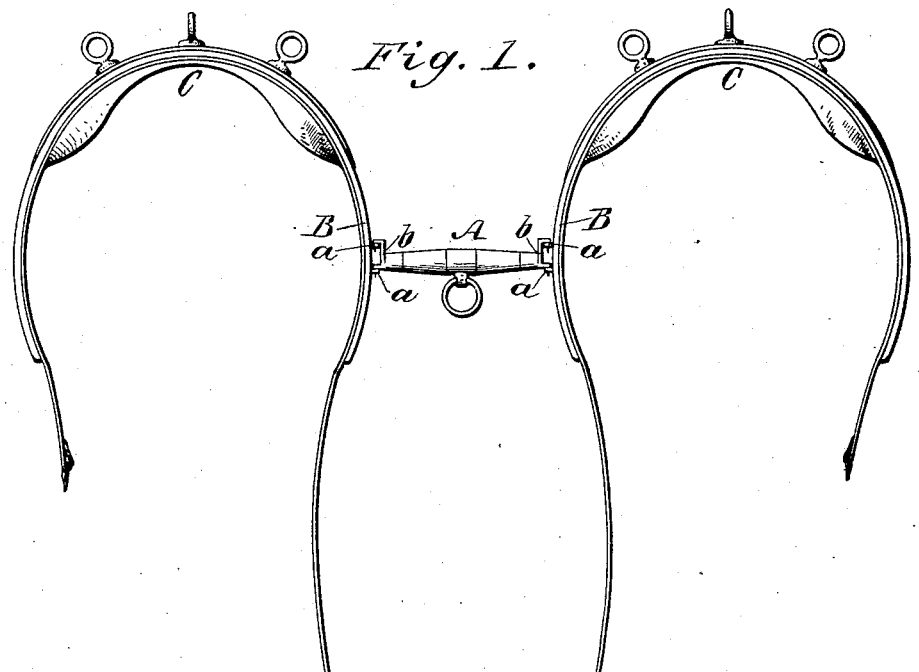
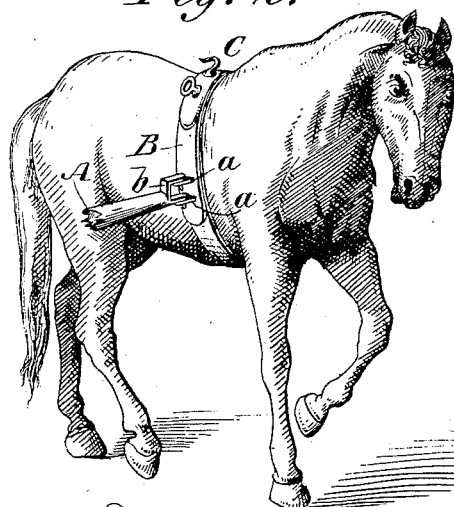
WITNESSES:
INVENTOR:
R. R. Noyes
BY Munn & Co
ATTORNEYS.

UNITED STATES PATENT OFFICE.

ROSWELL R. NOYES, OF DARLINGTON, WISCONSIN.

HARNESS AND NECK-YOKE FOR DOUBLE TEAMS.

SPECIFICATION forming part of Letters Patent No. 310,305, dated January 6, 1885.

Application filed October 7, 1884. (No model.)

*To all whom it may concern:*

Be it known that I, ROSWELL R. NOYES, of Darlington, in the county of Lafayette and State of Wisconsin, have invented a new and Improved Harness and Neck-Yoke for Double Teams, of which the following is a full, clear, and exact description.

This invention consists in providing the back-pads or skirts of double harness with means for holding the ends of the neck-yoke, and in adapting the neck-yoke to be held by the back-pads or skirts of the harness, whereby the weight of the tongue of the vehicle may be borne upon the backs instead of the necks of the horses.

Reference is to be had to the accompanying drawings, forming part of this specification, in which similar letters of reference indicate corresponding parts in both the figures.

Figure 1 shows the back-pads and skirts of a double harness having my invention applied thereto, showing a neck-yoke held by the skirts; and Fig. 2 is a perspective view showing one back-pad and skirt upon a horse, and showing, also, one end of the neck-yoke held by the skirt.

The neck-yoke A is much shorter than the usual form of neck-yoke, and is adapted to be attached by any suitable means to the inner skirts, B B, of the back-pads C C of the harness. In this instance, for attaching the neck-yoke to the skirts, I provide the skirts with the eye-plates *a a*, and the ends of the neck-yoke with the double hooks *b b*, adapted to fit in the eyes *a a*, thus forming a kind of hinge for holding the neck-yoke, so that the neck-yoke may swing in case one horse gets ahead of the other; but other suitable means for holding the neck-yoke might be devised and not depart from the principle of my invention, which is mainly to adapt the harness and yoke to support the tongue of the vehicle from the backs of the horses instead of from their necks, as heretofore.

In light rigs I may use straps in place of the neck-yoke A for attaching the tongue to the skirts of the harness.

Having thus described my invention, what I claim as new, and desire to secure by Letters Patent, is—

1. The combination, with the back-pads of a double harness, of a neck-yoke and means for pivotally connecting the ends of the neck-yoke to the skirts of the said back-pads, substantially as herein shown and described, and for the purpose set forth.

2. The skirts B, provided with the eye-plates *a*, in combination with the neck-yoke provided with the hooks *b*, substantially as and for the purposes set forth.

ROSWELL R. NOYES.

Witnesses:
P. H. CONLEY,
G. A. MARSHALL.